3,087,777
METHOD OF PRESERVING NITRITE CORROSION INHIBITORS
Donald G. Lundgren and Arthur E. Krikszens, Syracuse, N.Y., assignors to Allied Chemical Corporation, New York, N.Y., a corporation of New York
No Drawing. Filed June 8, 1960, Ser. No. 34,626
8 Claims. (Cl. 21—2.7)

This invention relates to a method of inhibiting corrosion caused by cooling water systems. More particularly it relates to the method of preserving the corrosion inhibiting properties of nitrites when they are used for this purpose in cooling water systems.

Although nitrites of metals above aluminum in the electromotive series have been found to be effective corrosion inhibitors when they are present in water, it has also been noted that water containing nitrite inhibitors which had been exposed to the atmosphere would gradually become corrosive. It was found that this was brought about by a gradual loss in nitrite content. Our investigation has established that the loss of nitrite is brought about particularly by *Nitrobacter agilis*, a bacterium which gets into the nitrite solution during its exposure to the air. This bacterium propagates in the solution and in so doing, exhausts the corrosion inhibiting nitrite.

Results of studies in which the circulating water systems were charged with 500 p.p.m. of nitrite showed the loss of nitrite (under normal atmospheric conditions) to be slow. A steady loss of nitrite occurred, with the loss extending over a period of 28 or more days. However, when this same nitrite starting solution charged with 500 p.p.m. of nitrite was inoculated with 20 ml. of $1 \times 10^6$ cells per ml. suspension of *Nitrobacter agilis*, the nitrite level would drop very rapidly and precipitously with a zero level of nitrite being reached in about 6 days.

Circulating cooling water systems are normally subjected to complex operating conditions involving agitation, aeration, and exposure, during which time atmospheric contamination is quite likely to take place. Contamination includes that of the ubiquitous microorganisms of air, soil, etc., and is also brought about by the chemical action from contact with metal and wood of the system in which it is used. Therefore, any agent which is to be used to stabilize the nitrite level will have to not only stabilize the nitrite level under varying conditions, but must itself remain stable and non-corrosive under the same conditions, even upon repeated dosage.

We have further found that, although most bacteriostatic and bactericide agents used in commerce have little or no effect in inhibiting the detrimental effects of the *Nitrobacter agilis* when present in nitrite solutions, certain of these materials prove very effective. Materials found to be effective include alkali metal azides, a hydroxylated chlorinated diphenyl methane, certain streptomycins and a metallo rosin amine-ethylene oxide type compound. These materials, when used, have been found to have a suppressing effect on both heterotrophic growth and autotrophic growth of the *Nitrobacter agilis*. It was found that when these materials were used, they would stabilize nitrite levels and permit circulating cooling water containing nitrite corrosion inhibitors to be used over extensive periods without losing their anticorrosive properties.

Of the azides, sodium azide is preferred in view of the fact that it is most readily available. This material has been found to be very effective as an inhibitor of *Nitrobacter agilis* in the presence of nitrites, even when used in concentrations as low as 1 p.p.m. and may be used in amounts up to 100 p.p.m. without deleterious effect.

The hydroxylated chlorinated diphenyl methane, which has been found to be most satisfactory for use as an inhibitor, is a material sold under the trade-name of Preventol G.D.C. This material is a 39% solution of 2,2' dihydroxy 5,5' dichloro diphenylmethane. It has also been found to be very suitable as an inhibitor of *Nitrobacter agilis* in the presence of nitrites. Excellent results have been obtained with concentrations of Preventol G.D.C. in nitrite solutions as low as 1 p.p.m. and may be used in concentrations up to 500 p.pm Agrimycin-100 and Agri-Strep are preferred examples of streptomycins which have been found to be suitable for use in inhibiting *Nitrobacter agilis* in the presence of nitrites. Agrimycin-100 is the trade-name for streptomycin 15%, oxytetracycline 1.5% and an inert diluent, and Agri-Strep is the trade-name for a powdered mixture containing 37% streptomycin sulfate and 63% inert materials. Of these two materials, the Agrimycin-100 has shown itself to be most effective. Neither of them, however, are quite as effective as the sodium azide and Preventol G.D.C. described herein above. The effective range for Agrimycin-100 is 1–500 p.p.m. and 10–500 p.p.m. for Agri-strep.

The metallo rosin amine ethylene oxide type compound which is suitable for use in inhibiting *Nitrobacter agilis* in the presence of nitrites, is a material which is sold commercially under the trade name Tin-San. It has been found very effecitve in controlling the *Nitrobacter agilis*, even when the Tin-San is used in concentrations as low as 1 p.p.m. Tin-San is the trade-name for tri-n-butyl tin chloride quaternized with Polyrad 0515. Polyrad 0515 is the trade-name of an adduct of ethylene oxide and dehydroabietyl amine in which 5 mols of the oxide have been reacted with 1 mol of the amine and the reaction product is intermixed with 15% by weight of the free amine. The effective range for this material in conjunction with the nitrite is 1 to 100 p.p.m.

The following is a description of examples of a test which was found useful in determining the chemicals which would interfere with oxidation of nitrite by *Nitrobacter agilis*. These tests were carried out by adding the chemicals to be tested in various concentrations to a standard nitrobacter medium containing 300 p.p.m. sodium nitrite so that the final volume in a 250 ml. flask, after inoculation, was 50 ml.

The standard nitrobacter medium used, Alexander's medium, contained:

A. $NaNO_2$— 0.3 g. ⎫
   $MgSO_4$— 0.17 g. ⎬ In 500 ml. water—autoclaved
   $NACl$— 0.17 g. ⎭
B. $FeSO_3$— 0.015 g. — 100 ml. water—Seitz filtered
C. $K_2HPO_4$— 0.17 g. — 200 ml. water—autoclaved
D. $CaCl_2$— 0.06 g. — 100 ml. water—autoclaved
E. $KHCO_3$— 1.50 g. — 100 ml. water—Seitz filtered 1000 ml. water The components of the medium were tested as follows:

A, C, D—adjusted to a pH of 8.0 before autoclaving.
B—not adjusted.
E—adjusted to pH 8.0 before filtering.
Final pH of medium after autoclaving was 7.5.

For development of cells to be used as inocula the medium was compounded in 6, 8 or 10 liter quantities in either a 3 or 5 gallon solution bottle-type fermentor equipped with a sparger (bacteriological filter). Aeration of the medium was obtained by means of air forced first through a baceteriological Selas porcelain filter (porosity #01) immersed in sterile water humidifier and then to the sparger in the fermentor. This treatment maintained a source of sterile air at a temperature of 26°–28° C. Inocula were built up from shake cultures to a volume of 10% of the mass culture medium.

Each flask was inoculated with 1 ml. of a nitrobacter stock culture containing $1 \times 10^9$ cells per ml. The flasks were then incubated at room temperature on a rotary shaker. Nitrite levels were determined every third day for a period of 12 days.

Example 1

When the initial concentration of sodium azide in the above-referred-to solution was 1 p.p.m., and the initial nitrite level was 300 p.p.m., under the above procedure, it was found that the nitrite level dropped off to 280 p.p.m. after a period of 12 days; whereas the nitrite level of a control, which was run simultaneously containing the same amount of nitrite and the same amount of *Nitrobacter agilis*, dropped to 0 p.p.m. in less than 6 days. A similar test carried out with an increase in sodium azide concentration to 10 p.p.m. resulted in a final nitrite level at the end of 12 days of 300 p.p.m., which was the same level as that of the nitrite content at the beginning of the test period.

Example 2

When a test was carried out in a manner similar to that described in Example 1, but using Preventol G.D.C. as the inhibiting agent in solutions containing an initial nitrite level of 300 p.p.m. and an inoculum of $1 \times 10^9$ cells per ml. of *Nitrobacter agilis*, the following results were obtained:

| Compound Tested | Concentration (p.p.m.) | NO$_2$ level, p.p.m. | | Days to reach final level |
|---|---|---|---|---|
| | | Initial | Final | |
| Preventol G.D.C. | 1 | 300 | 275 | 12 |
| | 10 | 300 | 275 | 12 |
| | 50 | 300 | 275 | 12 |
| | Control | 300 | 0 | 3 |

Example 3

When a test was carried out in a manner similar to that described in Example 1, but using Agrimycin-100 as the inhibiting agent in solutions containing an initial nitrite level of 300 p.p.m. and 1 ml. of an inoculum containing $1 \times 10^9$ cells of *Nitrobacter agilis*, the following results were obtained:

| Compound Tested | Concentration (p.p.m.) | NO$_2$ level, p.p.m. | | Days to reach final level |
|---|---|---|---|---|
| | | Initial | Final | |
| Agrimycin-100 | 1 | 300 | 61 | 12 |
| | 10 | 300 | 240 | 12 |
| | 50 | 300 | 295 | 12 |
| | Control | 300 | 0 | 3 |

Example 4

When a test was carried out in a manner similar to that described in Example 1, but using Agri-Strep as the inhibiting agent in solutions containing an initial nitrite level of 300 p.p.m. and 1 ml. of an inoculum containing $1 \times 10^9$ cells of *Nitrobacter agilis*, the following results were obtained:

| Compound Tested | Concentration (p.p.m.) | NO$_2$ level, p.p.m. | | Days to reach final level |
|---|---|---|---|---|
| | | Initial | Final | |
| Agri-Strep | 1 | 300 | 0 | 6 |
| | 10 | 300 | 150 | 12 |
| | 50 | 300 | 290 | 12 |
| | Control | 300 | 0 | 3 |

Example 5

When a test was carried out in a manner similar to that described in Example 1, but using Tin-San as the inhibiting agent in solutions containing an initial nitrite level of 300 p.p.m. and 1 ml. of an inoculum containing $1 \times 10^9$ cells of *Nitrobacter agilis*, the following results were obtained:

| Compound Tested | Concentration (p.p.m.) | NO$_2$ level, p.p.m. | | Days to reach final level |
|---|---|---|---|---|
| | | Initial | Final | |
| Tin-San | 1 | 300 | 295 | 12 |
| | 10 | 300 | 295 | 12 |
| | Control | 300 | 0 | 6 |

Agents were also tested in circulating water systems simulating commercial cooling water systems. The tests described in the following examples were run under controlled conditions in that the inoculum of *Nitrobacter agilis* in the circulating water exceeded by far the number of nitrobacter organisms one would expect as contaminants in a system under normal industrial operating conditions. The circulating water was further subjected to the normal complex variable conditions usually encountered in industrial operations; namely, agitation, aeration, pH, and contamination. The contamination included that of the ubiquitous microorganisms of air, soil, etc. and also the chemical action from water contact with metal and wood of the system.

It was found that the nitrite loss in tests run under these conditions very closely paralleled nitrite loss in the inoculated shaker flask test herein above described. In water at about 28° C. charged with 500 p.p.m. of sodium nitrite and inoculated with *Nitrobacter agilis* (20 ml. of a suspension of $1 \times 10^6$ cells per ml. in 9 liters of water), nitrite levels dropped rapidly in absence of a bactericide, reaching the zero level by 6 days.

Nitrate and ammonia levels remained negligible, never exceeding 5 to 10 p.p.m.

*Nitrobacter agilis* cell counts in these inoculated water systems increased steadily, in absence of a bactericide, from an initial count of approximately $1 \times 10^3$ cells per ml. to $1 \times 10^5$ cells per ml. during about 3 weeks, then levelled off; and heterotrophic populations similarly increased from about $1 \times 10^2$ cells per ml. to $1 \times 10^6$ per ml. These counts were made as in Example 6 below.

Example 6

Water (9 liters) which contained 500 p.p.m. of sodium nitrite and 10 p.p.m. of sodium azide was inoculated with approximately 20 ml. of inoculum containing approximately $1 \times 10^6$ cells per ml. This water was allowed to trickle from a trough over a series of baffles, exposed to the atmosphere, to a reservoir held at about 28° C. by a thermostatically controlled heating element; and was pumped back to the trough. A float valve maintained constant water level in the reservoir.

The nitrite loss in the circulating water was investigated by making daily checks, and bacterial plate counts of the water were made employing nutrient agar for isolation of the heterotrophic populations and either washed agar or Noble's agar supplemented with Alexander's medium above described for isolation of *Nitrobacter agilis*.

Results of this test showed that the nitrite exhaustion was retarded to a considerable extent: the zero level of nitrite was not reached until the 43rd day. The azide prevented growth of microorganisms in the circulating water for 7 days; and prevented the nitrobacter cell count, throughout the test, from substantially exceeding its initial value of about $1 \times 10^3$ cells per ml.

Example 7

When a test was carried out in a manner similar to that described in Example 6, but using 50 p.p.m. Preventol G.D.C. as the inhibiting agent in the circulating water, the nitrite levels in the water had dropped only to 300 p.p.m. at the expiration of 31 days, at which time the test was stopped. The effect of this added Preventol G.D.C. in preventing bacterial growth was somewhat less pronounced than that of sodium azide of Example 6: the highest nitrobacter cell count found in this test was 1×10⁴ cells per ml.

*Example 8*

When a test was carried out in a manner similar to that described in Example 6, but using 100 p.p.m. streptomycin sulfate, the zero level of nitrite was not reached until the 40th day.

Although the examples set forth hereinabove refer to single doses of the inhibiting agent, it is to be understood that periodic or repeated doses of the agent are contemplated. Furthermore, the pH of the cooling water should preferably be kept between about 5 and 7, since this range is below the range of 7.5 to 8 which is considered to be the most favorable for bacterial growth, but less corrosive than the more acid solutions.

Although certain preferred embodiments of the invention have been disclosed for purpose of illustration, it will be evident that various changes and modifications may be made therein without departing from the scope and spirit of the invention.

We claim:

1. The method of preserving the corrosion inhibiting properties of nitrites of metals above aluminum in the electromotive series present in cooling water systems which comprises providing for the presence in the cooling water along with the nitrite of 1 to 500 p.p.m. of a bacteria control medium selected from the group consisting of alkali metal azides, 2,2' dihydroxy 5,5' dichloro diphenylmethane, streptomycins, and tri n-butyltinchloride quaternized with an adduct of ethylene oxide with dehydroabietylamine.

2. The method of preserving the corrosion inhibiting properties of nitrites of metals above aluminum in the electromotive series present in cooling water systems which comprises providing for the presence of 1 to 100 p.p.m. of sodium azide in the cooling water along with the nitrite.

3. The method of preserving the corrosion inhibiting properties of nitrites of metals above aluminum in the electromotive series present in cooling water systems which comprises providing for the presence of 1 to 500 p.p.m. of 2,2' dihydroxy 5,5' dichloro diphenylmethane in the cooling water along with the nitrite.

4. The method of preserving the corrosion inhibiting properties of nitrites of metals above aluminum in the electromotive series present in cooling water systems which comprises providing for the presence of 3.7–185 p.p.m. of streptomycin sulfate in the cooling water along with the nitrite.

5. The method of preserving the corrosion inhibiting properties of nitrites of metals above aluminum in the electromotive series present in cooling water systems which comprises providing for the presence of 1 to 500 p.p.m. of a mixture containing 15 parts of streptomycin to 1.5 parts oxytetracycline in the cooling water along with the nitrite.

6. The method of preserving the corrosion inhibiting properties of nitrites of metals above aluminum in the electromotive series which comprises providing for the presence, in the cooling water along with the nitrite, of 1 to 100 p.p.m. of tri-n-butyl tin chloride quaternized with an ethylene oxide adduct of dehydroabietyl amine in which 5 mols of ethylene oxide have been reacted with 1 mol of amine and in which 15% by weight of free amine are in admixture therewith.

7. A corrosion inhibitor suitable for use in cooling water systems comprising a mixture of 1 to 10 parts by weight of sodium azide to 300 parts by weight of sodium nitrite.

8. A coolant suitable for use in systems containing ferrous metals comprising water containing a nitrite of a metal above aluminum in the electromotive series and 1 to 500 p.p.m. of a bacteria control medium selected from the group consisting of an alkali metal azide, 2,2' dihydroxy 5,5' dichloro diphenylmethane, streptomycins, and tri-n-butyl tin chloride quaternized with an adduct of ethylene oxide with dehydroabietylamine.

References Cited in the file of this patent

UNITED STATES PATENTS

| | | |
|---|---|---|
| 2,882,227 | Linberg | Apr. 14, 1959 |
| 2,906,595 | Pelcak et al. | Sept. 29, 1959 |

OTHER REFERENCES

Corrosion Prevention and Control, January 1955, vol. 2, No. 1, pp. 17–18. Copy in POSL.

Industrial and Engineering Chemistry, vol. 48, No. 12, December 1956, pp. 2162–2167.

The Petroleum Engineer, Reference Annual, 1951, p. B–98. (Copy in POSL.)

Bergey's Manual of Determinative Bacteriology, The Williams and Wilkins Co., Baltimore, 1957, 7th ed., pp. 72–73. (Copy in Div. 43.)